US009743346B2

(12) United States Patent
Ko

(10) Patent No.: US 9,743,346 B2
(45) Date of Patent: Aug. 22, 2017

(54) APPARATUS AND METHOD FOR SELECTING NETWORK IN COMMUNICATION SYSTEM

(71) Applicant: Samsung Electronics Co., Ltd., Suwon-si, Gyeonggi-do (KR)

(72) Inventor: Min-Suk Ko, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/069,936

(22) Filed: Nov. 1, 2013

(65) Prior Publication Data

US 2014/0141776 A1 May 22, 2014

(30) Foreign Application Priority Data

Nov. 22, 2012 (KR) ........................ 10-2012-0133303

(51) Int. Cl.
*H04W 48/18* (2009.01)
(52) U.S. Cl.
CPC .................... *H04W 48/18* (2013.01)
(58) Field of Classification Search
None
See application file for complete search history.

(56) References Cited

U.S. PATENT DOCUMENTS

| | | | | |
|---|---|---|---|---|
| 7,599,693 B2* | 10/2009 | Kuriyama | ............. | H04W 48/16 455/434 |
| 8,055,256 B2* | 11/2011 | Rudowicz | ............. | H04W 48/16 370/252 |
| 8,369,234 B2* | 2/2013 | Ha | ........................ | H04W 48/16 370/252 |
| 8,423,084 B2* | 4/2013 | Abramov | ............... | H01Q 1/246 370/330 |
| 8,543,109 B2* | 9/2013 | Kim | ..................... | H04W 60/005 455/435.1 |
| 8,600,434 B2* | 12/2013 | Han | ...................... | H04W 48/16 370/315 |
| 8,792,884 B2* | 7/2014 | Lim | .................. | H04M 1/72519 370/328 |
| 8,942,762 B1* | 1/2015 | Oroskar | .................. | H04L 12/66 370/352 |
| 9,229,791 B1* | 1/2016 | Thekkeettil | ........... | G06F 9/5016 |
| 2003/0196161 A1* | 10/2003 | Li | ........................ | H03M 13/15 714/784 |
| 2004/0224689 A1* | 11/2004 | Raghuram | ............ | H04W 48/16 455/435.3 |
| 2006/0094427 A1* | 5/2006 | Buckley | ................ | H04W 48/16 455/434 |
| 2007/0211669 A1* | 9/2007 | Umatt | .................... | H04W 48/18 370/335 |
| 2008/0167029 A1* | 7/2008 | Lindoff | ................ | H04J 11/0069 455/422.1 |
| 2010/0284326 A1* | 11/2010 | Oh | ........................ | H04L 1/0026 370/328 |
| 2011/0014913 A1 | 1/2011 | Yoon et al. | | |

(Continued)

*Primary Examiner* — Hilina K Demeter

(74) *Attorney, Agent, or Firm* — Jefferson IP Law, LLP

(57) ABSTRACT

A method and an apparatus for a Mobile Station (MS) to select a network in a communication network are provided. The method includes searching for a first network, and searching for a second network that has a lower priority than the first network while searching for the first network.

20 Claims, 7 Drawing Sheets

(56) References Cited

U.S. PATENT DOCUMENTS

| | | | |
|---|---|---|---|
| 2011/0201332 A1* | 8/2011 | Siomina | H04W 64/00 455/434 |
| 2011/0243122 A1* | 10/2011 | Lindoff | H04J 11/0076 370/350 |
| 2012/0020290 A1* | 1/2012 | Kanauchi | H04M 1/72536 370/328 |
| 2012/0063414 A1 | 3/2012 | Ramachandran | |
| 2012/0302241 A1* | 11/2012 | Klingenbrunn | H04W 48/16 455/436 |
| 2013/0109377 A1* | 5/2013 | Al-Khudairi | H04W 48/16 455/432.1 |
| 2013/0157662 A1* | 6/2013 | Han | H04W 48/18 455/436 |
| 2013/0170486 A1* | 7/2013 | Wang | H04W 48/18 370/342 |

* cited by examiner

APPARATUS AND METHOD FOR SELECTING NETWORK IN COMMUNICATION SYSTEM

PRIORITY

This application claims the benefit under 35 U.S.C. §119 (a) of a Korean patent application filed on Nov. 22, 2012 in the Korean Intellectual Property Office and assigned Serial No. 10-2012-0133303, the entire disclosure of which is hereby incorporated by reference.

BACKGROUND OF THE INVENTION

1. Field of the Invention

The present invention relates to a method and apparatus for selecting a network in a communication system. More particularly, the present invention relates to a method and apparatus for simultaneously searching for a plurality of networks and selecting a network.

2. Description of the Related Art

Mobile communication protocols have advanced from $2^{nd}$ Generation (2G) and $3^{rd}$ Generation (3G) technologies and are now focused on $4^{th}$ Generation (4G) technologies. Each generation of technology is distinguished based on a data transmission rate. Eurocentric asynchronous scheme-based communication technology and US centric synchronous scheme-based communication technology have continued in parallel until 3G. In 4G, an asynchronous-scheme based Long-Term Evolution (LTE) has become an unparalleled communication technology. Although the LTE technology has already been commonly used in several countries such as the U.S., Korea, and the like, it is not in widespread use. Accordingly, in an area where the LTE is not commonly used, mobile communication is supported by 2G or 3G communication technologies.

When a call is made in a Circuit Switched (CS) domain, an exclusive one-to-one physical route is established between a sender and a receiver and is maintained until the call is finished. Accordingly, because a connection is continuously maintained, a stable service is provided and delays occur infrequently.

Conversely, in a Packet Switched (PS) domain, data is bound based on a packet unit and a physical route is only connected between a sender and a receiver when a packet is to be transmitted. When there is no packet to be transmitted, the connection is released until data is generated again. Therefore, because network resources are consumed only when the data transmission is required, a network system may more effectively manage resources. However, a delay may occur more frequently in the PS domain when compared to the CS domain.

The LTE technology supports the PS domain but does not support the CS domain. Since the LTE technology does not support the CS domain, the LTE technology requires a mobile-Voice over Internet Protocol (mVoIP) technology such as Voice over LTE (VoLTE) to provide voice communication. However, a technical problem in mobility currently remains in the LTE technology. Therefore, various technologies have been proposed to support voice communication in the LTE network. Simultaneous Voice and LTE (SVLTE), which is an example of a proposed technology, is introduced by communication companies which have provided Code Division Multiple Access (CDMA) 2000 1xRTT and EV-DO as the 3G communication technology.

The SVLTE technology refers to a technology that provides voice communication through a CDMA2000 1xRTT network and provides data communication through an LTE network. That is, it enables data transmission and reception through an LTE network while voice communication is provided through a CDMA network. To support this, a mobile station uses a plurality of Radio Frequency (RF) modules, for example, 2 RF modules. That is, one RF module is used for the voice communication and the other RF module is used for the data communication.

However, there are not many areas where the LTE technology has been commonly used. Also, a mobile station that supports the LTE technology for overseas roaming service needs to perform communication with a 2G or 3G network in an area where the LTE network does not exist. A mode in which a mobile station supports a plurality of communication protocols corresponds to a global mode. In the corresponding mode, the mobile station selects a network system based on a predetermined priority and attempts to obtain the network system. In general, a mobile station that supports the SVLTE uses a priority of an MMSS Location Associated Priority List (MSPL) defined in the 3GPP2 C.S0016-D standard. The MSPL is a list indicating a priority of a network system that a mobile station attempts to obtain based on a national code and a network code of an area in which the mobile station is located. The mobile station attempts to obtain the network system based on the priority. Here, the priority is determined based on a combination of a home communication business operator, a roaming communication business operator, and a type of a network system. Generally, the home communication business operator has a relatively higher priority, and the latest communication technology has a higher priority than a previous communication technology when the communication company is the same. Generally, the roaming communication business operator has a lower priority than the home communication business operator in the MSPL, and a mobile station searches for a home system in a roaming area, and then searches for another network system. Therefore, in the roaming area, the mobile station expends a great amount of time to search for a network and thus establishing communication is delayed and performance of an overall communication system is deteriorated.

Therefore, a need exists for a system and method for selecting a network in a communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below.

Another aspect of the present invention is to provide a method and apparatus for selecting a network in a communication system.

Another aspect of the present invention is to provide a method and apparatus for selecting a network by simultaneously searching for a plurality of networks in a communication system.

Another aspect of the present invention is to provide a method and apparatus for selecting a network that minimizes a network selection delay time in a communication system.

In accordance with another aspect of the present invention, a method for a Mobile Station (MS) to select a network in a communication network is provided. The method includes searching for a first network, and searching for a second network that has a lower priority than the first network while searching for the first network.

In accordance with another aspect of the present invention, a method for an MS to select a network in a communication network is provided. The method includes determining a network search order based on a priority, and searching for a first network while searching for a second network based on the network search order, wherein the second network has a lower priority than the first network.

In accordance with another aspect of the present invention, an MS in a communication network is provided. The MS includes a first network protocol stack to search for a first network, and a second network protocol stack to search for the first network, and to search for a second network that has a lower priority than the first network while searching for the first network.

In accordance with another aspect of the present invention, an MS in a communication network is provided. The MS includes a Global Modem Controller (GMC) to determine a network search order based on a priority, a first network protocol stack to search for a first network based on the network search order, and the second network protocol stack to search for a second network based on the network search order, wherein the second network has a lower priority than the first network.

According to exemplary embodiments of the present invention, when the mobile station selects a network system and obtains a system having a low priority such as a roaming communication company, the mobile station simultaneously searches for a Code Division Multiple Access (CDMA) network and a Long Term Evolution (LTE) or a $3^{rd}$ Generation Partnership Project (3GPP) Legacy network and thus requires less time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
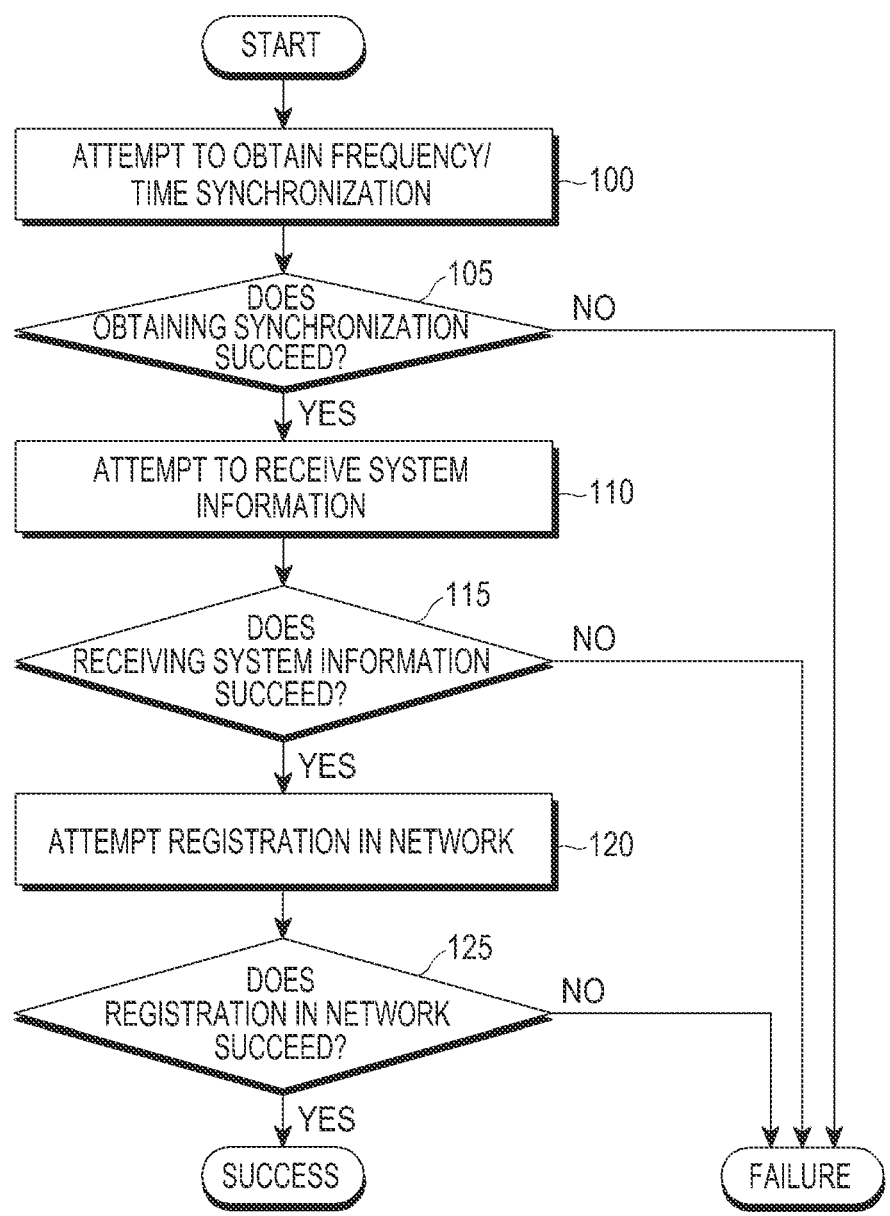
FIG. 1 is a flowchart illustrating a network registration process in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a network selecting method and apparatus in a communication system.

Also, exemplary embodiments of the present invention provide a network selecting method and apparatus that simultaneously searches for a plurality of networks in a communication system.

Also, exemplary embodiments of the present invention provide a network selecting method and apparatus that minimizes a network selection delay time in a communication system.

In the following description, it is assumed that the plurality of networks include, for example, a Long-Term Evolution (LTE) mobile communication system, a 3rd Generation Partnership Project (3GPP) Legacy mobile communication system, and a Code Division Multiple Access (CDMA) mobile communication system. However, the network selecting method and apparatus in the present invention may be applicable to other networks, in addition to the LTE mobile communication system, the 3GPP Legacy mobile communication system, and the CDMA mobile communication system.

Also, in the following description, it is assumed that a mobile station is a mobile station that supports a Simultaneous Voice and LTE (SVLTE) scheme and thus the mobile station selects a network using a plurality of Radio Frequency (RF) modules, for example, 2 RF modules. Therefore, the mobile station uses two RF modules to simultaneously support both a voice service and a data service and thus may reduce a time expended for searching for a network.

In an exemplary implementation, the mobile station searches for neighboring networks through the following steps so as to perform a process of registration in the retrieved networks.

First, the mobile station obtains a synchronization signal transmitted by a network, and obtains frequency/time synchronization. By obtaining the synchronization, the mobile station may normally receive a signal transmitted by the network. When the mobile station fails to obtain the synchronization, the mobile station determines that a network that is obtainable does not exist around the mobile station and may not proceed with a subsequent step.

When the mobile station obtains frequency/time synchronization of a network, the mobile station may receive System Information (SI) that is broadcasted by the network based on a predetermined period. The SI may include a type of the network and information associated with whether the mobile station is able to be registered. When the mobile station fails to receive SI broadcasted by the network in which the mobile station is able to be registered, the mobile station determines that a network in which the mobile station is able to be registered does not exist around the mobile station and may not proceed with a subsequent step.

When the mobile station receives SI from a neighboring network, the mobile stations establishes a physical connection with the network, and performs authentication and registration processes. Here, the first step and the second step correspond to processes that are performed by the mobile station by itself without recognition by a network. However, in the third step, the network recognizes existence of the mobile station.

FIG. 1 is a flowchart illustrating a network registration process in a wireless communication system according to an exemplary embodiment of the present invention.

Referring to FIG. 1, a mobile station attempts to obtain frequency/time synchronization of a neighboring network in step 100. The mobile station determines whether obtaining synchronization with the network succeeds in step 105, and receives system information that is periodically broadcasted by the network in step 110 when obtaining the synchronization succeeds. Conversely, when the mobile terminal fails to obtain the frequency/time synchronization, the mobile station determines that a network with which the mobile station obtains synchronization does not exist.

The mobile station determines whether the system information is received in step 115, and when receiving of the system information succeeds, the mobile station attempts to perform registration with a network corresponding to the system information in step 120. Conversely, when the mobile station fails to receive the system information, the mobile station determines that a network in which the mobile station is able to be registered does not exist. The mobile station determines whether the registration operation with the network succeeds in step 125. When the registration in the network succeeds, a subsequent registration process is successfully completed, and when the registration in the network fails, the mobile station determines that a network in which the mobile station is able to be registered does not exist.

In FIG. 1, a network registration process in a wireless communication system according to an exemplary embodiment of the present invention has been described. Hereinafter, a global mode network registration process in a wireless communication system according to an exemplary embodiment of the present invention will be described with reference to FIG. 2.

Figure 2:
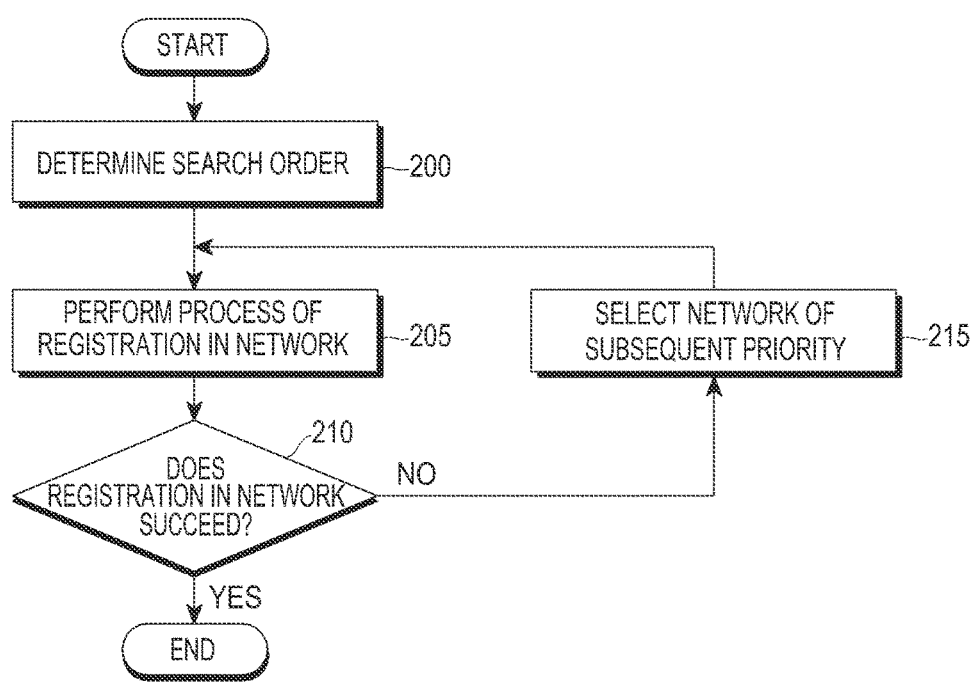
FIG. 2 is a flowchart illustrating a global mode network registration process in a wireless communication system according to an exemplary embodiment of the present invention.

FIG. 2 is a flowchart illustrating a global mode network registration process in a wireless communication system according to an exemplary embodiment of the present invention.

Referring to FIG. 2, a mobile station determines priorities of neighboring networks for which search is to be performed in step 200. The mobile station determines the priorities of the neighboring networks for which search is to be performed based on, for example, an MMSS Location Associated Priority List (MSPL), or determines the priorities of the neighboring networks for which search is to be performed using a priority order list for each communication business operator. Based on the priority order list for search, a network registration process is performed sequentially from a network with the highest priority in step 205. The network registration process has been described with reference to FIG. 1 and thus a description thereof will be omitted. It is determined whether registration in a network succeeds in step 210. When the registration succeeds, a network selection process is successfully completed. Conversely, when the network registration process fails, a network registration process is performed sequentially from a network having the highest priority in the priority list excluding the network that fails registration in step 215.

In FIG. 2, a global mode network registration process in a wireless communication system according to an exemplary embodiment of the present invention has been described. Subsequently, a network registration process in a wireless communication system according to another exemplary embodiment of the present invention will be described with reference to FIG. 3.

Figure 3:
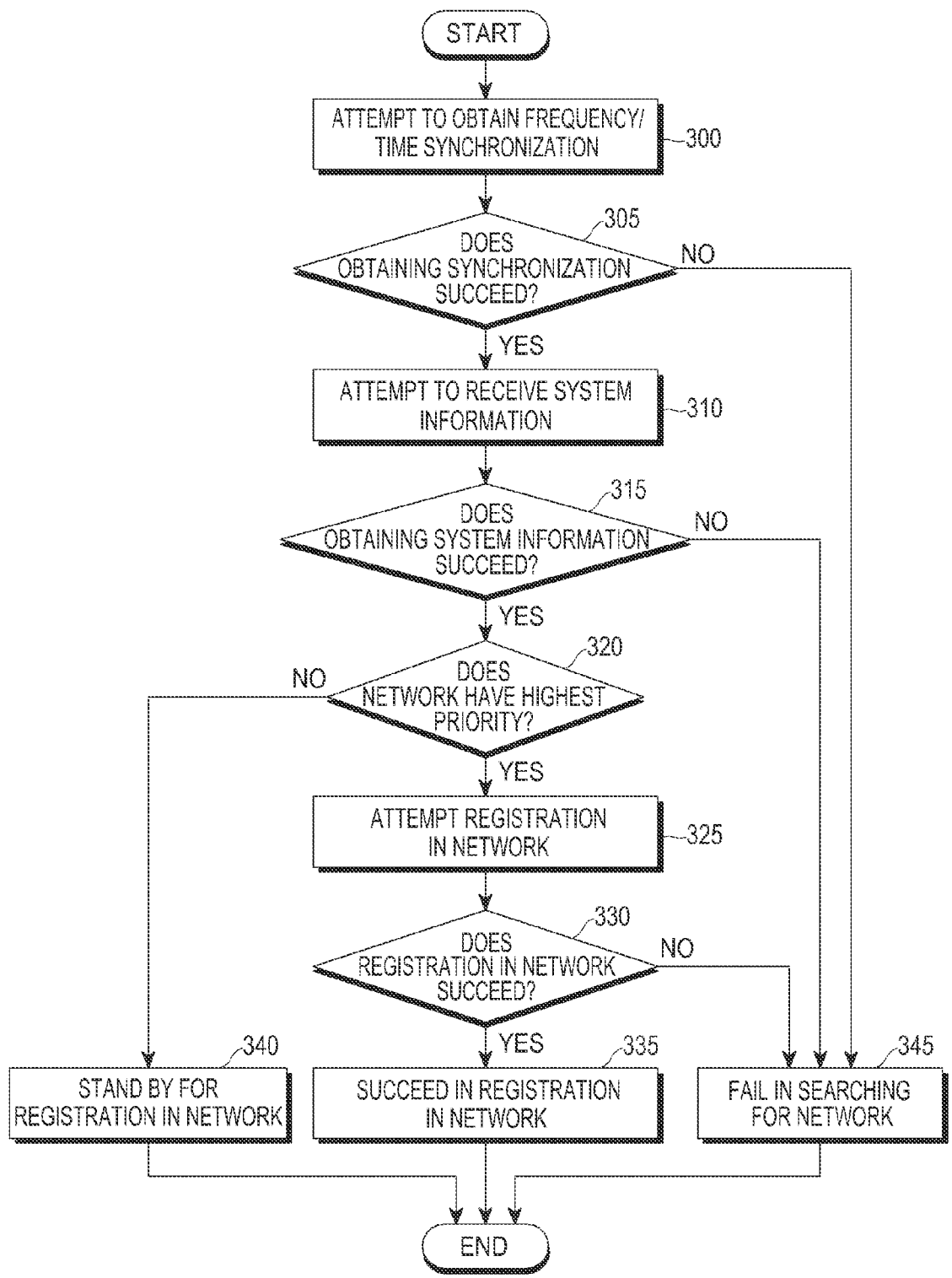
FIG. 3 is a flowchart illustrating a network registration process in a wireless communication system according to another exemplary embodiment of the present invention.

FIG. 3 is a flowchart illustrating a network registration process in a wireless communication system according to another exemplary embodiment of the present invention.

Referring to FIG. 3, a mobile station attempts to obtain frequency/time synchronization with a network in step 300. The mobile station determines whether obtaining the frequency/time synchronization succeeds in step 305, and determines that a network with which the mobile station obtains the frequency/time synchronization does not exist in step 345 when the obtaining of the frequency/time synchronization fails. When the mobile station obtains the frequency/time synchronization, the mobile station attempts to receive system information that is periodically broadcasted by the network in step 310. The mobile station determines whether the mobile station receives the system information in step 315, and determines that a network from which the mobile station is able to receive the system information does not exist in step 345 when the mobile station fails to receive the system information of the network. Conversely, when the mobile station obtains the system information, the mobile station determines whether a network from which the mobile station obtains the system information corresponds to a network having the highest priority in step 320. When the network from which the mobile station obtains the system information does not correspond to the network having the highest priority, the mobile station stands by for a registration process with the network in step 340. Conversely, when the network from which the mobile station obtains the system information corresponds to the network having the highest priority, the mobile station attempts a registration process with the network in step 325. Subsequent to step 325, the mobile station determines whether registration in the network succeeds in step 330, and determines that a network in which the mobile station is able to be registered does not exist when the registration in the network fails in step 345. Conversely, when the registration succeeds, the network registration process is successfully completed in step 335.

In FIG. 3, a network registration process in a wireless communication system according to another exemplary embodiment of the present invention has been described. Hereinafter, a network selection process in a wireless communication system according to another exemplary embodiment of the present invention will be described with reference to FIG. 4.

Figure 4:
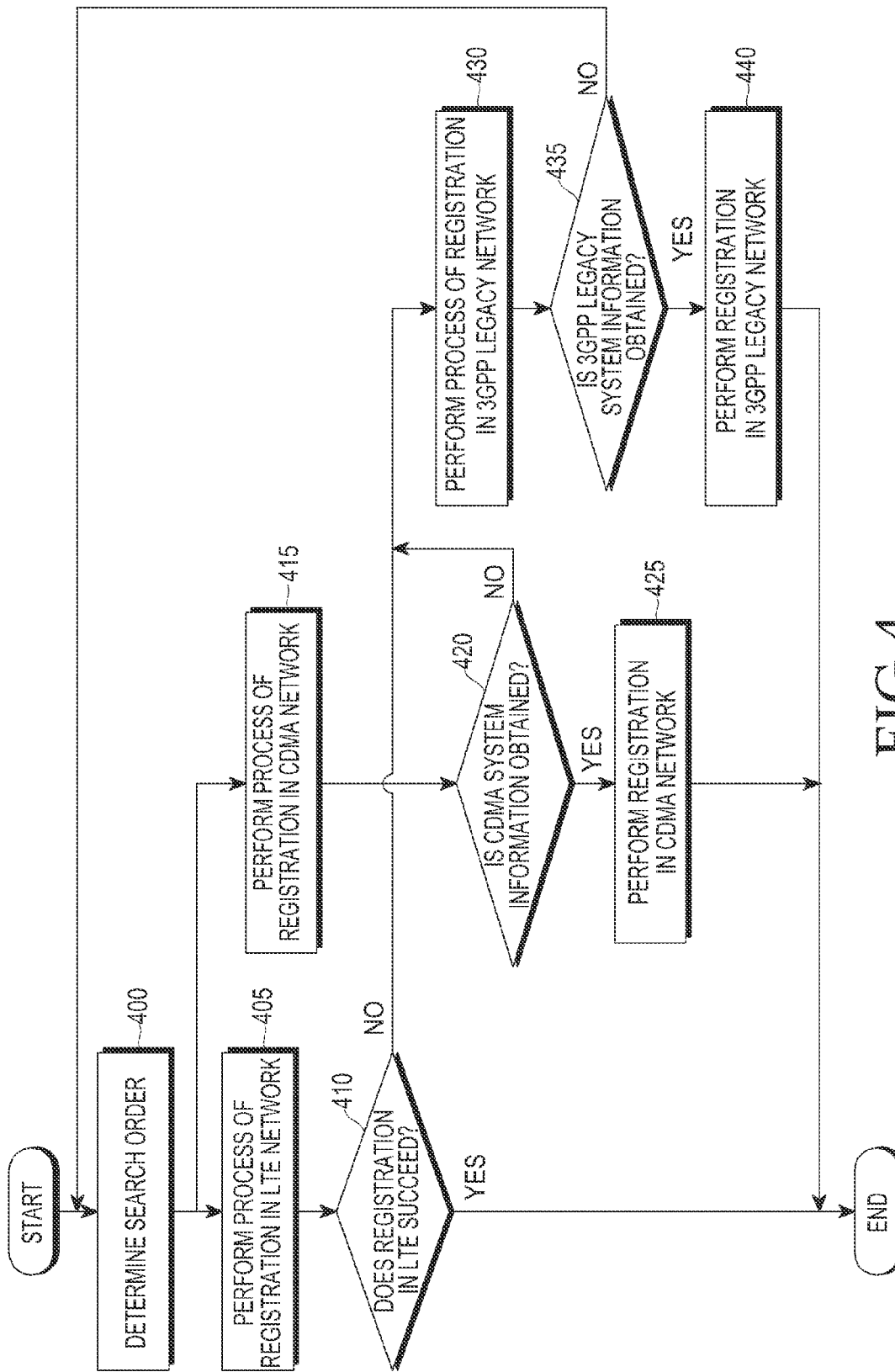
FIG. 4 is a flowchart illustrating a network selection process in a wireless communication system according to another exemplary embodiment of the present invention.

FIG. 4 is a flowchart illustrating a network selection process in a wireless communication system according to another exemplary embodiment of the present invention.

According to the network selection process in FIG. 4, a mobile station simultaneously searches for a plurality of networks by controlling a first module and a second module in parallel, selects a network based on a search result, and performs a registration operation to correspond to a predetermined priority. Here, the first module includes an LTE stack and a 3GPP Legacy stack, and each stack may be referred to as a first network protocol stack. Also, the first network is assumed to be a network that uses, for example, an asynchronous scheme.

The second module includes a CDMA stack, and the stack may be referred to as a second network protocol stack. Also, the second network is assumed to be a network that uses, for example, a synchronous scheme. The Global Modern Controller (GMC) includes a first module and a second module.

Referring to FIG. 4, the GMC determines a priority of a network for which a search is to be performed in step 400. The priority order is assumed to be an order of an LTE network, a CDMA network, and a 3GPP Legacy network. The first network protocol stack attempts a process of registration in the LTE network in step 405 and the second network protocol stack attempts a process of registration in the CDMA network in step 415. In step 410, the GMC determines if registration in the LTE network succeeds. When the registration in the LTE network is completed first while the second network protocol stack performs the registration in the CDMA network, the network selection process is completed by the registration in the LTE network. That is, when the registration in the LTE network succeeds, the network selection process is completed through the registration in the LTE network, irrespective of the registration in the CDMA network. Conversely, when the second network protocol stack completes a process of the registration in the CDMA network first while the first network protocol stack performs a process of registration in the LTE network, the registration in the CDMA network is not immediately performed and a result of the process of the registration in the LTE network having a higher priority than the CDMA network is awaited. When the first network protocol stack fails to perform the registration in the LTE network, the first network protocol stack attempts a process of registration in the 3GPP Legacy network that has a lower priority than the LTE network in step 430. A determination is also made of whether system information of the CDMA network is obtained in step 420. When the second network protocol stack normally obtains the system information from the CDMA network as a result of the determination, the registration in the CDMA network is performed in step 425 and the network selection process is completed. That is, in step 425, the registration in the LTE network having a higher priority than the CDMA network already fails and thus the process of the registration in the CDMA network may be performed without determining a search result for the 3GPP Legacy network having a lower priority than the CDMA network. However, when the second network protocol stack fails to obtain the system information from the CDMA network and the first network protocol stack performs the process of the registration in the 3GPP Legacy network in step 430, whether system information is normally obtained from the 3GPP Legacy network is determined in step 435. When it is determined that the system information is obtained by determining whether the system information is obtained from the 3GPP Legacy network, the registration in the 3GPP network is completed in step 440 and the network selection process is completed. However, when the system information is not obtained from the 3GPP Legacy network, the network selection process is performed again from step 400. A case in which the network registration process fails corresponds to a case in which time/frequency synchronization of the network fails, a case in which reception of system information fails, and a case in which registration in a network fails.

In FIG. 4, a network selection process in a wireless communication system according to another exemplary embodiment of the present invention has been described. Hereinafter, an internal structure of a mobile station in a wireless communication system according to an exemplary embodiment of the present invention will be described with reference to FIG. 5.

Figure 5:
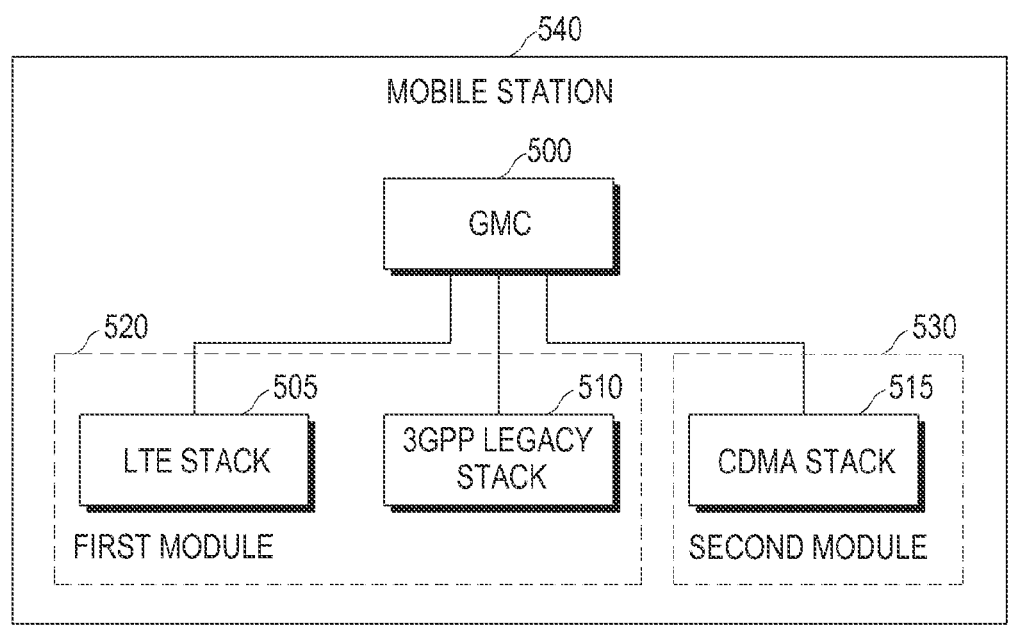
FIG. 5 is a diagram illustrating an internal structure of a terminal in a wireless communication system according to an exemplary embodiment of the present invention.

FIG. 5 is a diagram illustrating an internal structure of a terminal in a wireless communication system according to an exemplary embodiment of the present invention.

Referring to FIG. 5, a mobile station 540 includes a first module 520, a second module 530, and a GMC 500. The GMC 500 determines a network search order based on a priority. For example, when a first network and a second network having a lower priority than the first network exist and a search result for the first network is received earlier than a search result for the second network, the GMC 500 performs controlling so that the search result for the first network is awaited during a predetermined period of time. Also, when the search result for the first network is not received during the predetermined period of time, the GMC 500 performs controlling so that a registration operation with the second network is performed, and provides a corresponding network stack with a search and registration command associated with a network system, based on a type of the network.

The first module 520 includes an LTE stack 505 and a 3GPP Legacy stack 510, and the second module 530 includes a CDMA stack 515. The LTE stack 505 performs a corresponding command when a search and registration process request associated with an LTE network system is received from the GMC 500, and informs the GMC 500 of a result. The 3GPP Legacy stack 510 includes communication technologies before LTE, such as GSM, UMTS, and HSPA, developed by the 3GPP which is a Eurocentric organization for standardization. The 3GPP Legacy stack 510 performs a corresponding command when a search and registration process request associated with a 3GPP Legacy network system is received, and informs the GMC 500 of a result. The CDMA stack 515 includes CDMA2000 1×RTT and EVDO communication technologies. The CDMA stack 515 performs a corresponding command when a search and registration process request associated with a CDMA network system is received, and informs the GMC 500 of a result.

In FIG. 5, the internal structure of a mobile station in a wireless communication system according to an exemplary embodiment of the present invention has been described. Hereinafter, a network selection process according to an exemplary embodiment of the present invention will be described with reference to FIG. 6.

Figure 6:
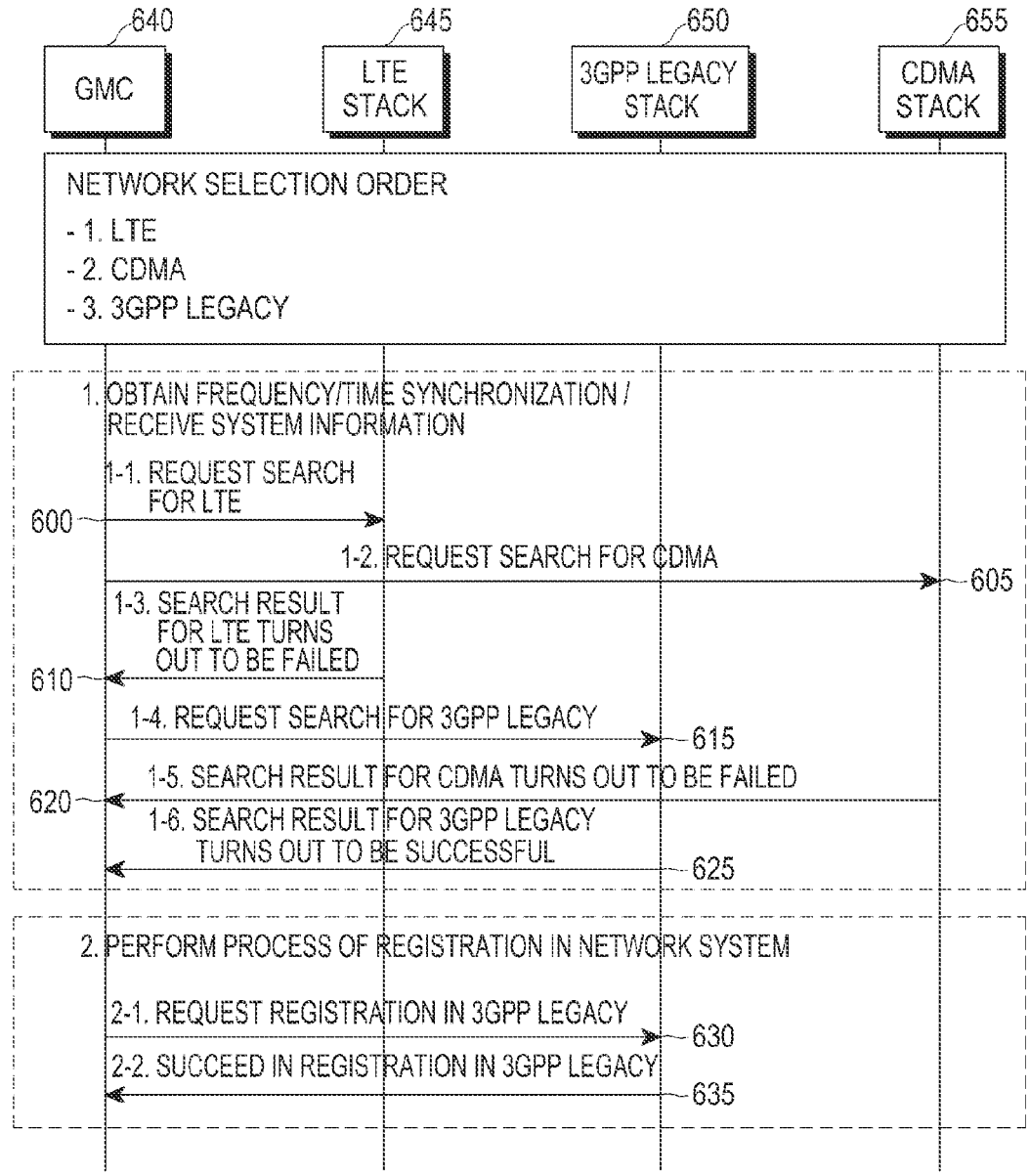
FIG. 6 is a signal flow diagram illustrating a network selection process in a wireless communication system according to an exemplary embodiment of the present invention.

FIG. 6 is a signal flow diagram illustrating a network selection process in a wireless communication system according to an exemplary embodiment of the present invention.

Referring to FIG. 6, a network selection order corresponds to an order of an LTE network, a CDMA network, and a 3GPP Legacy network, and it is assumed that only the 3GPP Legacy network exists in a corresponding area. A GMC 640 controls a first control module including an LTE stack 645, a 3GPP Legacy stack 650, and a separate RF transmitter and an antenna, and controls a second control module including a CDMA stack 655 and a separate RF transmitter and an antenna. A process in which the GMC 640 controls each communication protocol stack includes obtaining frequency/time synchronization of a network associated with a corresponding communication scheme and receiving system information, and controlling to perform a process of registration in the network. The GMC 640 requests the LTE stack 645 having the highest priority in the first module to search for an LTE network in step 600. The GMC 640 also requests the CDMA stack 655 included in the second module to search for a CDMA network in step 605. For purpose of description, it is assumed that the LTE network does not exist. Thus, a search result in step 600 turns out to be failed and the LTE stack 645 transmits the result to the GMC 640 in step 610. That is, the GMC 640 fails to obtain a synchronization channel transmitted by the LTE network or fails to obtain system information in step 610 and thus the GMC 640 determines that the LTE network does not exist in the corresponding area. Subsequent to step 610, the GMC 640 requests the 3GPP Legacy stack 650 of the first module to search for a 3GPP Legacy network in step 615. That is, in step 615, the CDMA stack 655 of the second module searches for the CDMA network, and the 3GPP Legacy stack proceeds with network search using a module including an RF transmitter and an antenna separately from the CDMA stack although the 3GPP Legacy network has a lower priority than the CDMA network. For purpose of description, it is assumed that the CDMA network does not exist and thus the search result turns to be failed. In that case, the CDMA stack 655 transmits the result to the GMC 640 in step 620. That is, in step 620, the GMC 640 fails to obtain a synchronization channel transmitted by the CDMA network or fails to obtain system information and thus the GMC 640 determines that the CDMA network does not exist in the corresponding area. It is also assumed that the 3GPP Legacy network exists and thus the search result for the 3GPP Legacy turns out to be successful in step 625. In that case, the 3GPP Legacy stack 650 transmits the search result to the GMC 640. Subsequent to step 625, the GMC 640 determines that the LTE network and the CDMA network, which have higher priorities than the 3GPP Legacy network, do not exist in the corresponding area, and the search for the 3GPP Legacy network succeeds in step 625. Thus, the GMC 640 controls the 3GPP Legacy stack 650 and requests registration in the 3GPP Legacy network in step 630. Subsequently, the 3GPP Legacy stack 650 performs a registration process with the 3GPP Legacy network, including resource allocation, authentication, encryption, and the like, and the 3GPP Legacy stack 650 transfers a result of the registration process with the 3GPP Legacy network to the GMC 640 in step 635.

In FIG. 6, a network selection process in a wireless communication system according to an exemplary embodiment of the present invention has been described. Hereinafter, a network selection process in a wireless communication system according to another exemplary embodiment of the present invention will be described with reference to FIG. 7.

Figure 7:
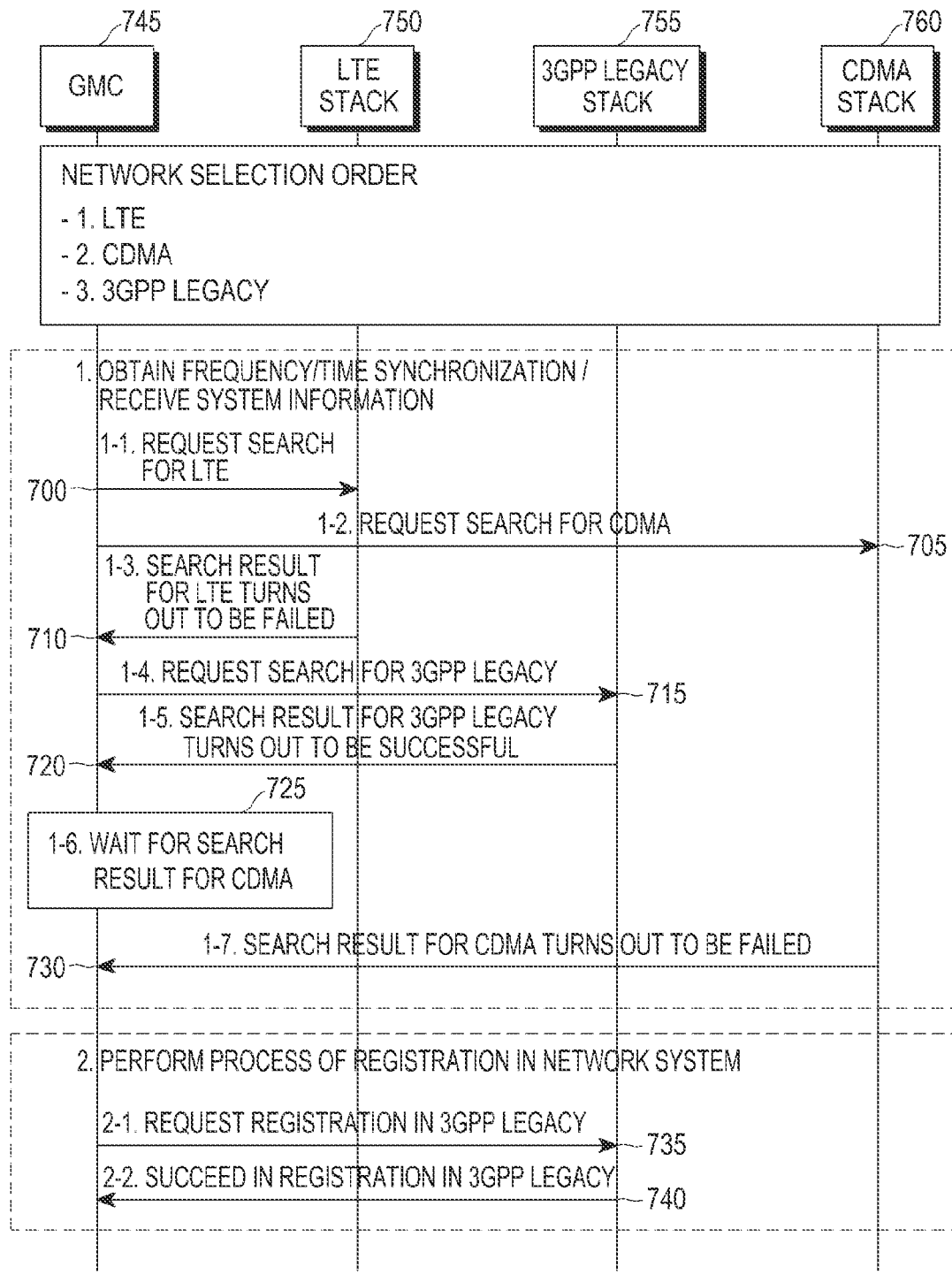
FIG. 7 is a signal flow diagram illustrating a network selection process in a wireless communication system according to another exemplary embodiment of the present invention.

FIG. 7 is a signal flow diagram illustrating a network selection process in a wireless communication system according to another exemplary embodiment of the present invention.

Referring to FIG. 7, a network selection order corresponds to an order of LTE, CDMA, and 3GPP Legacy. It is assumed that only a 3GPP Legacy network, which is one of 3GPP Legacies, exists in a corresponding area, and a search result for the 3GPP Legacy network is received earlier than a search result for a CDMA network. A GMC 745 controls a first control module including an LTE stack 750, a 3GPP Legacy stack 755, and a separate RF transmitter and an antenna, and controls a second control module including a CDMA stack 760 and a separate RF transmitter and an antenna.

The GMC 745 requests the LTE stack 750 having the highest priority in the first module to search for an LTE network in step 700. Simultaneously, the GMC 745 requests the CMDA stack 760 included in the second module to search for a CDMA network in step 705. For purpose of description, it is assumed that the LTE network does not exist and thus the search result in step 700 turns out to be failed and the LTE stack 750 transmits the result to the GMC 745 in step 710. That is, in step 710, the GMC 745 fails to obtain a synchronization channel transmitted by the LTE network or fails to obtain system information and thus the GMC 745 determines that the LTE network does not exist in the corresponding area. Subsequent to step 710, the GMC 745 requests the 3GPP Legacy stack 755 of the first module to search for a 3GPP Legacy network in step 715. Subsequent to step 715, the 3GPP Legacy stack 755 transmits a search result for the 3GPP Legacy network to the GMC 745 in step 720. For purpose of description, it is assumed that the 3GPP Legacy network exists and thus the 3GPP Legacy stack 755 transmits, to the GMC 745, the search result indicating success in step 720. However, the CDMA network having a higher priority than the 3GPP legacy network may exist and thus the GMC 745 does not immediately perform a process of registration in the 3GPP Legacy network and waits until a search result for the CDMA network is obtained in step 725. For purpose of description, it is assumed that the CDMA network does not exist and thus the search result in step 705 turns out to be failed after the waiting time. In that case, the CDMA stack 760 transmits the result to the GMC 745 in step 730. Therefore, in step 730, the GMC 745 fails to obtain a synchronization channel transmitted by the CDMA network or fails to obtain system information and thus the GMC 745 determines that the CDMA network does not exist in the corresponding area. Subsequent to step 730, the GMC 745 determines that the LTE network and the CDMA network having higher priorities than the 3GPP Legacy do not exist in the corresponding area in steps 710 and 730, and search for the 3GPP Legacy network succeeds in step 720 and thus the GMC 745 requests the 3GPP Legacy stack 755 to perform registration in the 3GPP Legacy network in step 735. Subsequently, the 3GPP Legacy stack 755 performs a registration process with the 3GPP Legacy network, including resource allocation, authentication, encryption, and the like, and the 3GPP Legacy stack 755 transfers a result of the registration process with the 3GPP Legacy network to the GMC 745 in step 740

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a mobile station (MS) to communicate in a communication network, the method comprising:
   controlling a first module and a second module in parallel to simultaneously search for a first network and a second network, respectively;
   searching for the second network that is different from the first network while searching for the first network;
   waiting for reception of the search result for the first network during a predetermined period if the search result for the second network is received earlier than the search result for the first network;
   selecting one of the first network and the second network based on the search result; and
   performing a registration operation to the selected network,
   wherein a second priority related to the second network is lower than a first priority related to the first network.

2. The method of claim 1, wherein the selected network is the second network if the search result for the first network is not received during the predetermined period of time.

3. The method of claim 2, wherein the first network corresponds to a network that uses an asynchronous scheme, and the second network corresponds to a network that uses a synchronous scheme.

4. The method of claim 1, wherein the first network corresponds to one of a long-term evolution (LTE) mobile communication system and a 3rd generation partnership project (3GPP) legacy mobile communication system, and the second network corresponds to a code division multiple access (CDMA) mobile communication system.

5. The method of claim 1, wherein one of the first network and the second network is searched using a first radio frequency for supporting a voice service, and the other network is searched using a second radio frequency for supporting a data service.

6. A mobile station (MS) in a communication network, the MS comprising:
   a first module configured to search for a first network;
   a second module configured to search for a second network that is different from the first network while searching for the first network; and
   at least one processor configured to:
      control the first module and the second module in parallel to simultaneously search for the first network and the second network, respectively,
      wait for reception of the search result for the first network during a predetermined period of time if the search result for the second network is received earlier than the search result for the first network,
      select one of the first network and the second network based on the search result, and
      perform a registration operation to the selected network,
   wherein a second priority related to the second network is lower than a first priority related to the first network.

7. The MS of claim 6, wherein the selected network is the second network if the search result for the first network is not received during the predetermined period of time.

8. The MS of claim 7, wherein the first network corresponds to a network that uses an asynchronous scheme, and the second network corresponds to a network that uses a synchronous scheme.

9. The MS of claim 6, wherein the first network corresponds to one of a long-term evolution (LTE) mobile communication system and a 3rd generation partnership project (3GPP) legacy mobile communication system, and the second network corresponds to a code division multiple access (CDMA) mobile communication system.

10. The MS of claim 6, wherein one of the first network and the second network is searched using a first radio frequency for supporting a voice service, and the other network is searched using a second radio frequency for supporting a data service.

11. A method for a mobile station (MS) to communicate in a communication network, the method comprising:
    determining a network search order based on a priority;
    controlling a first module and a second module in parallel to simultaneously search for a first network and a second network, respectively, based on the network search order;
    searching for the second network being different from the first network based on the network search order while searching for the first network;
    waiting for receipt of the search result for the first network during a predetermined period of time if the search result for the second network is received earlier than the search result for the first network;
    selecting one of the first network and the second network based on the search result; and
    performing a registration operation to the selected network,
    wherein a second priority related to the second network is lower than a first priority related to the first network.

12. The method of claim 11, wherein the selected network is the second network if the search result for the first network is not received during the predetermined period of time.

13. The method of claim 12, wherein the first network corresponds to a network that uses an asynchronous scheme, and the second network corresponds to a network that uses a synchronous scheme.

14. The method of claim 11, wherein the first network corresponds to one of a long-term evolution (LTE) mobile communication system and a 3rd generation partnership Project (3GPP) legacy mobile communication system, and the second network corresponds to a code division multiple access (CDMA) mobile communication system.

15. The method of claim 11, wherein one of the first network and the second network is searched using a first radio frequency for supporting a voice service, and the other network is searched using a second radio frequency for supporting a data service.

16. A mobile station (MS) in a communication network, the MS comprising:
    at least one processor configured to determine a network search order based on a priority;
    a first module configured to search for a first network based on the network search order; and
    a second module configured to search for a second network being different from the first network based on the network search order while the first module searches for the first network,
    wherein the at least one processor is further configured to:

control the first module and the second module in parallel to simultaneously search for the first network and the second network, respectively, based on the network search order, wait for receipt of the search result for the first network during a predetermined period of time if the search result for the second network is received earlier than the search result for the first network, select one of the first network and the second network based on the search result, and perform a registration operation to the selected network; and wherein a second priority related to the second network is lower than a first priority related to the first network.

17. The MS of 16, wherein the selected network is the second network if the search result for the first network is not received during the predetermined period of time.

18. The MS of claim 17, wherein the first network corresponds to a network that uses an asynchronous scheme, and the second network corresponds to a network that uses a synchronous scheme.

19. The MS of claim 16, wherein the first network corresponds to one of a long-term evolution (LTE) mobile communication system and a 3rd generation partnership project (3GPP) legacy mobile communication system, and the second network corresponds to a code division multiple access (CDMA) mobile communication system.

20. The MS of claim 16, wherein one of the first network and the second network is searched using a first radio frequency for supporting a voice service, and the other network is searched using a second radio frequency for supporting a data service.

* * * * *